May 13, 1924.

F. HALLGREN

CLUTCH OPERATING DEVICE

Filed May 15, 1922

1,494,238

F. Hallgren
INVENTOR

BY Victor J. Evans
ATTORNEY

WITNESS:

Patented May 13, 1924.

1,494,238

UNITED STATES PATENT OFFICE.

FRED HALLGREN, OF YOUNGSVILLE, PENNSYLVANIA.

CLUTCH-OPERATING DEVICE.

Application filed May 15, 1922. Serial No. 561,196.

*To all whom it may concern:*

Be it known that I, FRED HALLGREN, a citizen of the United States, residing at Youngsville, in the county of Warren and State of Pennsylvania, have invented new and useful Improvements in Clutch-Operating Devices, of which the following is a specification.

This invention relates to Fordson tractors or the like, and contemplates the provision of an attachment therefor, by means of which the clutch can be controlled from a point remote from the clutch operating pedal, so that the operator may remain upon the ground during the operation of the tractor and controlling the same, or may occupy a position upon a machine or the like which might be coupled to the tractor, and control the clutch from this position.

The nature and advantages of the invention will be better understood when the following detailed description is read in connection with the accompanying drawings, the invention residing in the construction, combination, and arrangement of parts as claimed.

In the drawings forming part of this application, like numerals of reference indicate similar parts in the several views, and wherein:—

Figure 1:
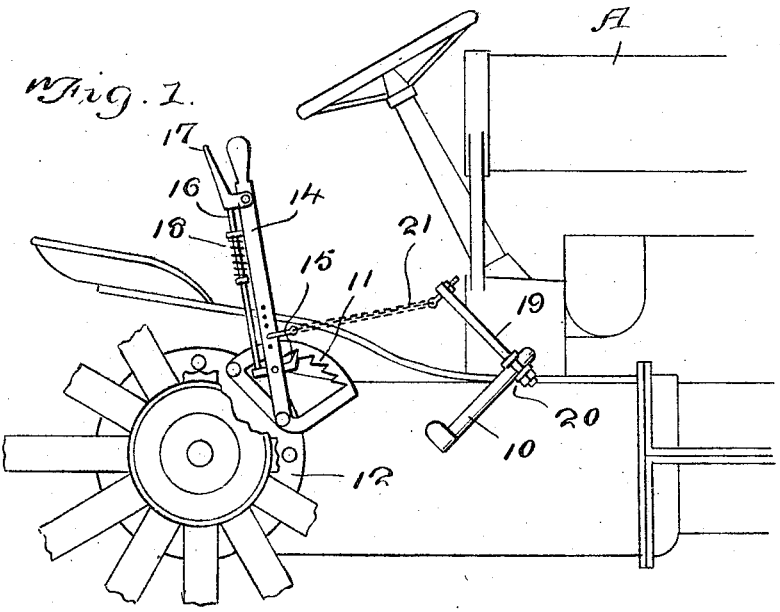
Fig. 1 is a view showing the device positioned on a tractor.
Figure 2:
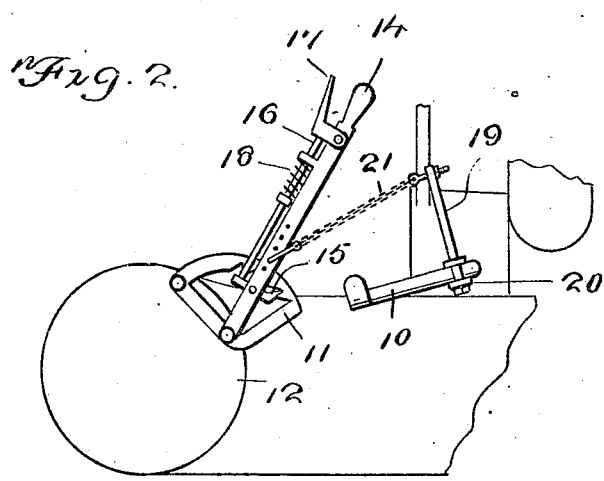
Fig. 2 is a detail view showing the device in the clutch engaging position.

Referring to the drawings in detail, A indicates a portion of a Fordson tractor, wherein 10 represents the clutch pedal with which the invention is designed for use for the purpose of controlling the clutch to a point remote from the pedal 10.

In carrying out the invention, I make use of a quadrant 11 which is attached to or supported by the differential casing 12 by means of an especially designed stud herein illustrated.

An operating lever 14 is fulcrumed at its lower end upon this quadrant, and has associated therewith a pawl 15 which cooperates with the teeth of the quadrant to hold the lever 14 in any adjusted position. The pawl 15 is connected to a rod 16 arranged in juxta-position to the lever 17 which is fulcrumed upon the main lever 14. Manifestly, when the lever 17 is moved in a direction of the lever 14 against the tension of the spring 18, the pawl is released from the quadrant, allowing the main lever 14 to be shifted upon its fulcrum.

Rising from the clutch pedal 10 is a rod 19, the latter being associated with the foot pedal through the instrumentality of a clamp 20. This rod 19 is connected with the lever 14 by means of a chain 21, so that when the lever 14 is shifted, the clutch pedal is simultaneously actuated, but permits said clutch pedal to be actuated independently of said lever. By reason of the lever 14, it is obvious that the clutch of the tractor can be controlled from a point at the rear of the tractor, so that the operator can remain upon the ground, while the tractor is in operation, and still control the movements of the latter, or he can occupy a position upon an agricultural implement or the like which might be coupled to the tractor, and still be within convenient reach of the lever 14 for the purpose specified.

While it is believed that from the foregoing description, the nature and advantages of the invention will be readily apparent, I desire to have it understood that I do not limit myself to what is herein shown and described, and that such changes may be resorted to when desired as fall within the scope of what is claimed.

What I claim is:—

The combination with a tractor including a clutch operating pedal, of a toothed quadrant mounted on the tractor at a point remote from the pedal, a lever fulcrumed on the quadrant, a pawl associated with the lever and normally engaging the teeth of the quadrant, means for releasing the pawl, a rod projecting at a right angle from said pedal, an element terminally connected with the rod and the lever, whereby the pedal may be actuated incident to the movement of the lever, said connecting element being flexible to allow movement of the pedal independently of the lever, and said lever having a vertical series of openings, whereby the adjacent end of the element can be connected with the lever at different points in its length.

In testimony whereof I affix my signature.

FRED HALLGREN.